(12) United States Patent
Root et al.

(10) Patent No.: US 12,331,448 B2
(45) Date of Patent: Jun. 17, 2025

(54) MICROPLASTIC COMPACTOR AND METHOD OF COMPACTING MICROPLASTICS

(71) Applicant: INHERITING EARTH LIMITED [GB]/[GB], Bristol (GB)

(72) Inventors: Adam Root, Bristol (GB); Reuben Kettle Aiers, Bristol (GB); Thomas Ruddell, Bristol (GB); Ntani Kokkinos, Bristol (GB)

(73) Assignee: Inheriting Earth Limited, Bristol (GB)

( * ) Notice: Subject to any disclaimer, the term of this patent is extended or adjusted under 35 U.S.C. 154(b) by 127 days.

(21) Appl. No.: 17/757,002

(22) PCT Filed: Dec. 9, 2020

(86) PCT No.: PCT/IB2020/061691
§ 371 (c)(1),
(2) Date: Jun. 7, 2022

(87) PCT Pub. No.: WO2021/116933
PCT Pub. Date: Jun. 17, 2021

(65) Prior Publication Data
US 2023/0030772 A1 Feb. 2, 2023

(30) Foreign Application Priority Data
Dec. 10, 2019 (GB) ..................................... 1918145

(51) Int. Cl.
*D06F 39/10* (2006.01)
*C02F 103/00* (2006.01)
*D06F 39/08* (2006.01)

(52) U.S. Cl.
CPC ............ *D06F 39/10* (2013.01); *D06F 39/083* (2013.01); *C02F 2103/002* (2013.01); *C02F 2307/12* (2013.01)

(58) Field of Classification Search
CPC .. D06F 39/10; D06F 39/083; C02F 2103/002; C02F 2307/12; Y02W 30/62
(Continued)

(56) References Cited

U.S. PATENT DOCUMENTS 3,681,947 A * 8/1972 Cowan .................. B01D 29/46
210/167.01
3,827,213 A * 8/1974 Matzinger ............... B65B 63/08
53/370.4
(Continued)

FOREIGN PATENT DOCUMENTS

EP 1528139 A2 * 5/2005 ............. D06F 43/00
WO WO-8908163 A1 * 9/1989
(Continued)

*Primary Examiner* — David G Cormier
*Assistant Examiner* — Thomas Bucci
(74) *Attorney, Agent, or Firm* — Schott, P.C.

(57) ABSTRACT

The invention relates to preventing microplastics from entering the environment. The invention is directed to filtering and compacting microplastics from any effluent, but in particular to filtering and compacting microfibers from the wastewater of washing machines and other appliances. However, the invention may also be applied in any industry where microparticles are generated, e.g. the industrial manufacture of textiles, or in treating roadside runoff, or where microparticles are handled, e.g. in Waste Water Treatment Plants. The invention is a compactor for automatically extracting and compressing microplastics from waste effluent, the compactor comprising; a chamber with an inlet; at least one plate within the chamber moveable between a non-compressing position and a compressing position, and a drive unit for driving the at least one plate; and a discharge outlet arranged to allow the automatic discharge of compressed microplastics.

18 Claims, 11 Drawing Sheets

(58) Field of Classification Search
USPC .......................................................... 68/208
See application file for complete search history.

(56) References Cited

U.S. PATENT DOCUMENTS

| | | | | |
|---|---|---|---|---|
| 5,762,171 | A * | 6/1998 | Mizer | D01B 1/04 |
| | | | | 19/41 |
| 5,768,988 | A * | 6/1998 | Meloni | B30B 9/3035 |
| | | | | 100/246 |
| 9,316,440 | B2 * | 4/2016 | Kim | D06F 58/22 |
| 10,815,610 | B2 * | 10/2020 | Lee | B08B 3/14 |
| 11,045,843 | B2 * | 6/2021 | Lyne | C02F 1/001 |
| 11,230,806 | B2 * | 1/2022 | Welch | D06F 25/00 |
| 11,753,763 | B2 * | 9/2023 | Welch | D06F 25/00 |
| | | | | 34/601 |
| 2005/0045565 | A1 * | 3/2005 | Perry | C02F 1/004 |
| | | | | 210/744 |
| 2011/0303589 | A1 * | 12/2011 | Kuennen | C02F 1/52 |
| | | | | 210/120 |
| 2013/0340797 | A1 * | 12/2013 | Bommels | D06F 39/10 |
| | | | | 134/104.1 |
| 2019/0093279 | A1 * | 3/2019 | Grider | D06F 58/22 |
| 2019/0126326 | A1 * | 5/2019 | Lyne | C02F 1/001 |
| 2020/0208336 | A1 * | 7/2020 | Masters | B01D 45/14 |
| 2020/0208337 | A1 * | 7/2020 | Welch | D06F 58/22 |
| 2022/0106728 | A1 * | 4/2022 | Welch | D06F 39/10 |

FOREIGN PATENT DOCUMENTS

| | | | | |
|---|---|---|---|---|
| WO | WO-2019081013 | A1 * | 5/2019 | ............ D06F 33/30 |
| WO | WO-2019081014 | A1 * | 5/2019 | ............ D06F 33/37 |

\* cited by examiner

MICROPLASTIC COMPACTOR AND METHOD OF COMPACTING MICROPLASTICS

BACKGROUND

Field of the Invention

The invention relates to preventing microplastics from entering the environment. The invention is directed to filtering and compacting microplastics from any effluent, but in particular filtering, compacting and automatically ejecting compacted microfibers from the wastewater of washing machines and other appliances or industrial equipment or Waste Water Treatment Plants.

Description of Related Art

Microfibres are the most abundant form of microplastic pollution in rivers and oceans. Due to their microscopic scale, microfibers are eaten by organisms at all levels of the food chain, from plankton to top predators. Once ingested, plastics reduce feeding efficiency (false satiation) they may damage the gut of the animal and transfer harmful additives like PCBs, pesticides, flame retardants to the animal that consumed it. Plastics consumed by animals low in the food chain also impact their predators, which consume numerous contaminated prey daily. The pervasiveness of microfibers in the food chain has naturally resulted in concern regarding their transfer to humans, and contamination has been observed in crustaceans, molluscs and fish species destined for human consumption.

Unlike microbeads, which are easily excluded from toiletries and cleaning products, microfibres are formed through damage to clothing. One third of all microplastics in the oceans come from washing of synthetic textiles. Synthetic fabrics derived from petrochemicals make up 65% of all textiles. Wear and tear caused by abrasive forces in washing machines result in the fragmentation of man-made textiles, forming hundreds of thousands of microfibres, less than 5 mm in length, which leak from homes and drainage networks into the ocean.

Wastewater treatment plants cannot remove the millions of fibres that pass through them every day. Currently, secondary level water treatment removes around 98% of the microplastics that pass through them. However, the small proportion that escapes still equates to tens of millions of fibres per treatment works per day.

Furthermore, wastewater treatment plants produce a "sewage sludge" and plastic microfibers are found on discharge when released into the natural environment when the sludge is spread on agricultural land, thus microfibers make their way into the food chain, waste to energy (which can destroy fibres but release harmful gasses) or discharged into rivers or the ocean.

Current washing machine filters are designed to stop pennies and buttons breaking the washing machine pump. The filtration required to stop microfibers is less than 80 micrometers (um), which is about the width of a human hair.

It is known to provide mesh filters that stop the problem at source. For example, the filter described in AU2019100807 has a mesh filter. However, mesh filters clog up quickly with the accumulated microfibers, and when this happens their effectiveness drops off considerably. This causes the pressure to drop and the flow rate to reduce, which can lead to damage to pumps and other elements of the system and flooding. Whilst these mesh filters go some-way towards collecting microfibre waste, and therefore preventing it from reaching the environment, they do not typically provide a convenient means for disposal of this accumulated waste product.

A typical domestic washing machine is shown in FIG. 1 in schematic form. The machine 100 includes a rotatable sealed drum unit 101 for receiving garments to be washed. The sealed drum unit 101 has a perforated cylindrical rotatable drum mounted inside a static waterproof shroud. Clean water is fed into the drum 101 via a cold water inlet 102 connected to mains and under mains pressure of typically 1 bar. The water entering the drum 101 is managed by an electronic valve, under the control of a CPU 104. The inlet 102 is connected to a drawer 105 where liquid or powdered detergent can be added by a user. The drawer has an outlet that leads to the drum unit 101. The drum unit may include a heater under the control of the CPU to heat the water to the desired wash temperature, typically up to 90 degrees Celsius.

The drum is rotatable by an electric motor 106 under the control of the CPU 104 at speeds of typically from 5 to 1600 rpm. The drum unit can be emptied via an outlet having an electronically operated drain valve 107 and a drain pump 108 both controlled by the CPU. The drain pump is rated with a given power to produce a known pressure at its output. The drain pump feeds into an outlet 109 which is connected to the household or industrial drain and eventually the wastewater network.

In use, dirty laundry is placed in the drum, and a wash cycle initiated by a user. The CPU allows cold water to flow via the drawer to mix with detergent and then on into the drum, where the water is heated. The combined water, detergent and laundry is agitated by rotating the drum. During this process, dirt and grease is released into the water and fibres from the clothing too. If the clothing is synthetic, microfibers are typically released as the clothes rub against each other. The resulting effluent at the end of the wash cycle is a mixture of debris, dirt, grease and microfibers and potentially large objects such as coins or nails left in the clothing. This effluent is then drained and pumped out of the drum at a typical rate of 2 gallons per minute. Second or third rinse cycles with clean water may be performed, resulting in effluent with less concentrated contaminants.

In a typical wash, the highest concentration of microfibers is in the range 5 mm to 150 um but shorter microfibers exist that are still harmful in the environment. If it were required to remove 99% of microfibers of all sizes down to 50 um in length, a mesh with apertures of 50 um would theoretically be able to achieve this. In practice however, such a mesh placed directly in the stream of effluent will clog almost immediately and the filter will become inoperable. This will create a rise in pressure consumption in the outlet and potentially damage the pump.

It is necessary to open this device and clean the mesh by hand to return its pressure consumption back to a level for it to operate effectively, i.e. to regenerate its pressure consumption. An alternative is to flush the filter with further water, and direct the flushed waste water to collect in a sump. Again these sumps must be regularly cleaned by hand. Both options present a tedious and messy process to the user. Alternatively, this waste accumulates in one or more sumps within the machine. The sumps require frequent emptying and cleaning to ensure machine efficiency. They also do not directly solve the problem of preventing this waste from entering the environment, nor do they address the issue of handling such microscopic fibres for effective disposal. The present invention therefore seeks to overcome the problem of separating microplastic waste from a waste flow of effluent, and the convenient disposal of this waste product.

It is known to provide a washing machine with a separate wash-fluid reclamation unit, see for example the disclosure of EF1528139. Here, a filter is disclosed that has a press for pressing down on the concentrate, and there is a discharge outlet for allowing out the extracted liquor, but the compressed debris must be removed by hand by the user.

Apparatus for the removal of solids and fats from the effluent of washing machines or dishwashers is described in WO89/08163. An upper part of a filter is sponge-like and retains fats, which can be squeezed out of the sponge and drained out of the outlet. However, there are no features for automatic removal of solids.

SUMMARY OF THE INVENTION

The present invention seeks to overcome the problem of separating microplastic waste from a waste flow of effluent, and the convenient disposal of this waste product in an automated process that minimises user intervention.

According to an aspect of the present invention, there is provided a compactor for extracting and compressing microplastics from a waste effluent, the compactor comprising; a chamber; an inlet for supplying waste effluent into the chamber; at least one plate within the chamber, moveable between a non-compressing position and a compressing position; and, a drive unit for driving the at least one plate between the non-compressing position and the compressing position; and a discharge outlet arranged to allow the discharge of compressed microplastics, wherein the at least one plate is operable, in use, to extract and compress the microplastics from waste effluent, and wherein the at least one plate is arranged to move the compressed microplastics to the discharge outlet, wherein the compactor is arranged such that, in use, the compressed microplastics are automatically discharged from the compactor via the discharge outlet by the movement of the at least one plate. A user does not need to physically clean or otherwise remove the separated microplastics from the equipment because this is done automatically by the action of the plate or plates.

The compactor may comprise a pair of co-operating plates spaced from one another to enable waste effluent to be received and compressed therebetween, the plates being moveable towards and away from each other advantageously along a common axis.

A first plate may be driven by the drive unit towards and away from a second plate. The second plate may be driven by the drive unit towards and away from the first plate. The first plate may move the second plate into a compressing position, and the second plate may comprise a biasing element for returning the second plate to the non-compressing position. The biasing element may be a spring or latched cam or other stored potential energy (i.e compressed fluid). The drive unit may be a linear actuator. The linear actuator may be ram driven with linear reciprocating action. The drive means may be a manually operated drive such as a lever or push rod. The drive unit may be a part of the washing powder drawer of a washing machine.

The drive unit may be arranged to drive the plate against an end of the chamber. The end of the chamber may be releasable to form the discharge outlet.

The drive unit may be a hydraulic actuator. The hydraulic actuator, in use, may be operatively connected to a pressurised water supply from the washing machine.

The at least one plate may comprise a permeable material. The wall of the chamber may include a permeable material. The permeable material may be a mesh. The chamber may comprise a waste water outlet arranged to drain waste water out of the chamber. The chamber may be substantially cylindrical. The discharge outlet may be within a lower wall of the chamber arranged to discharge compressed microplastics under gravity. The discharge outlet may comprise a removable lid. The outlet and inlet may include non-return valves.

According to another aspect of the present invention, there is provided, a washing machine including a compactor of the type disclosed herein is provided.

According to another aspect of the present invention, there is provided, a method of operating a compactor of the type disclosed herein is provided, comprising the steps of:
receiving a flow of effluent;
driving a plate through the effluent from a non-compressing position to a compressing position, for separating the effluent into liquid and solid components and compressing the resultant solid material which includes microplastics;
returning the plate to a non-compressing position;
discharging the compressed microplastics.

BRIEF DESCRIPTION OF THE DRAWINGS

Embodiments of the invention are described below, by way of example only, by reference to the accompanying drawings, in which.

DETAILED DESCRIPTION OF THE PREFERRED EMBODIMENT

While the description that follows focuses on washing machines for clothes, it is to be understood that the teachings herein are not limited to use in washing machines as they are equally suited to other processing appliances, such as but not limited to driers, such as tumble driers, dyeing machines, cutting machines, recycling machines, dry cleaning machines and so on. The teachings herein could also be used in other industries in which microparticles may be generated as a result of processing of items, for example equipment for use in the industrial manufacture of textiles. References to washing machines herein are therefore to be understood as comprising any similar appliance of the types contemplated herein.

It will further be appreciated that the teachings herein are suited to any application that requires the removal of microplastics, including microfibers, from any effluent, including wastewater, within which such materials may be entrained. Such other applications include Waste Water Treatment Plants or treating the runoff from roads within the road drainage system.

Figure 1:
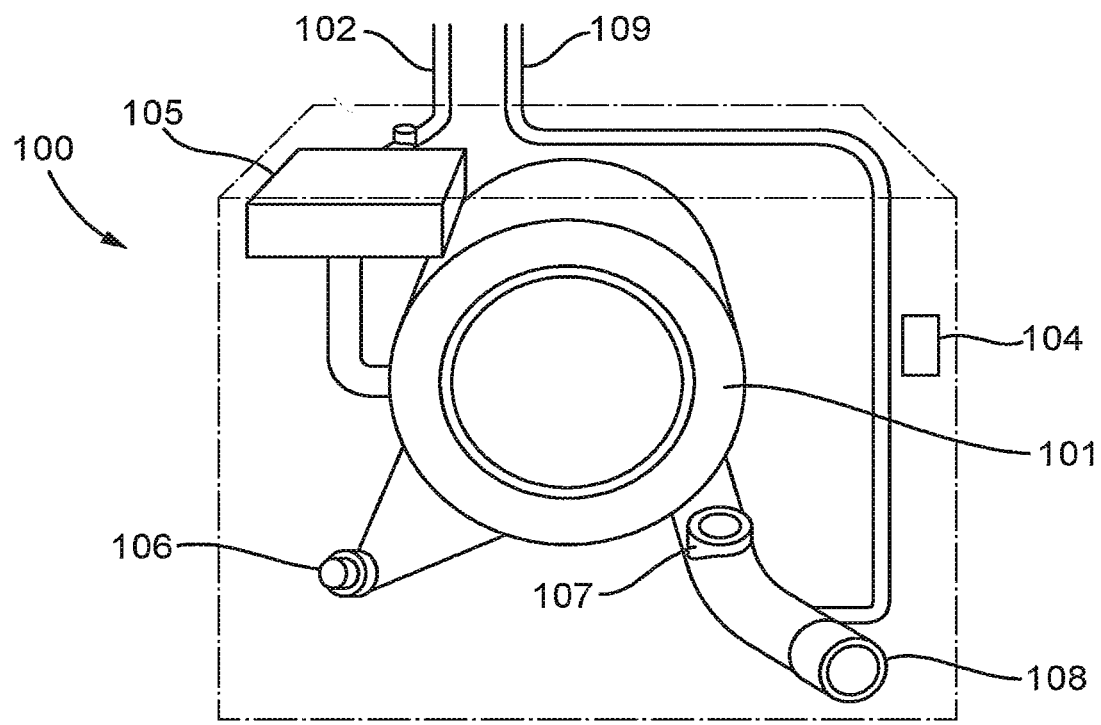
FIG. 1 is a view of the internal workings of a standard washing machine.

The typical domestic washing machine shown in FIG. 1 removes a mixture of debris, dirt, grease, microfibers and other detritus from the dirty laundry. The resulting effluent at the end of the wash cycle, that is drained from the drum, is subject to various filtration processes, in an attempt to remove the majority of the contaminants prior to drainage. Whilst the larger items of waste matter can easily be captured by a filter and collected within a chamber for removal by a user, the microfibers, due to their size, present much more challenging waste matter to filter. This is because conventional filters that can stop microfibers of around 80 um in size quickly blind over with larger debris in the 100 to 400 um range, reducing their effectiveness to effectively zero which makes them impractical to use. Mesh filters and membrane filters are normally cartridges that are disposable. However, this adds to the problem of disposing of plastic waste because the cartridges often needs changing when they are full of around 1 gram of microfibers, but themselves weigh 150 grams or more. Multi-stage mesh-based filtration systems, for example that described in UK patent application GB1914545.7 are very effective at separating microfibers from the waste water stream, where the separated microfibers are accumulated in a sump. These sumps contain a messy effluent, that is difficult to discharge from the machine. The sump is often cleaned at the sink, with the waste entering the household drainage system, thereby defeating the object of the separation process.

Figure 2A:
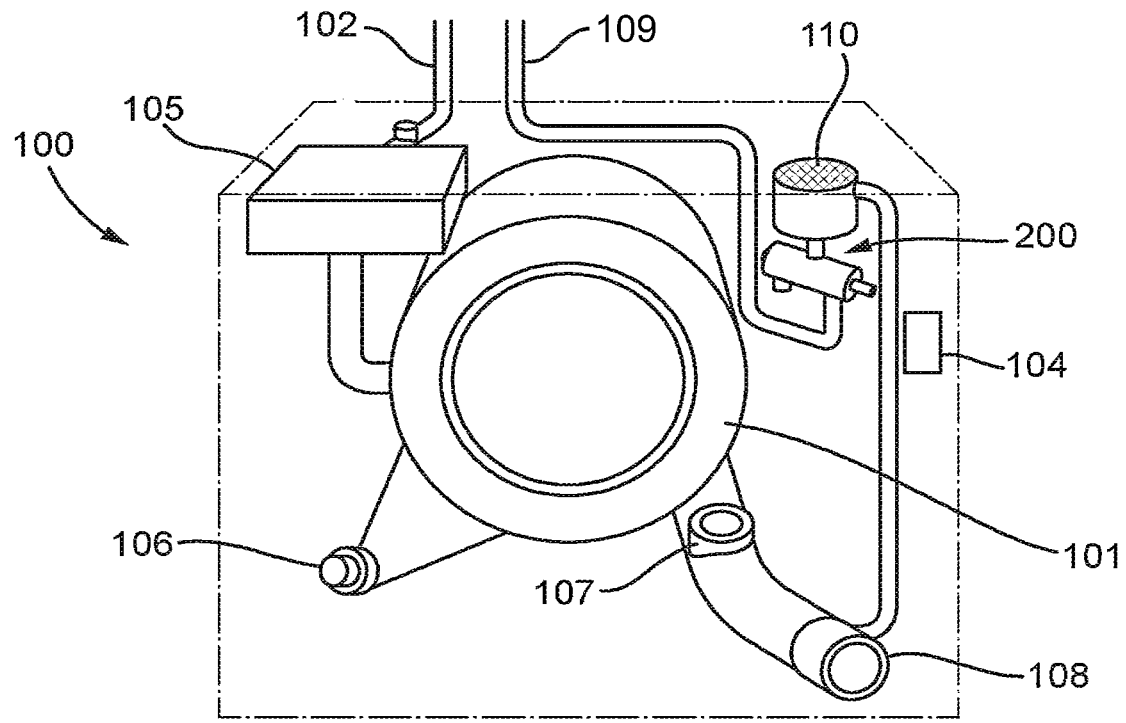
FIG. 2a is a view of an embodiment of the invention installed within the washing machine of FIG. 1.

An embodiment of the invention provides a microplastic extraction and compression chamber, as shown in FIG. 2a, for removing accumulated microplastic fibres from the effluent contained within the sump, and compacting these microfibers to pellet form, for ease of disposal through the household refuse collection. This reduces packaging size and weight to improve the ability to ship the fibres for the circular economy. After removing all of the water from the matter separated from the effluent, a lightweight puck of material remains that can be handled very efficiently.

Figure 2B:
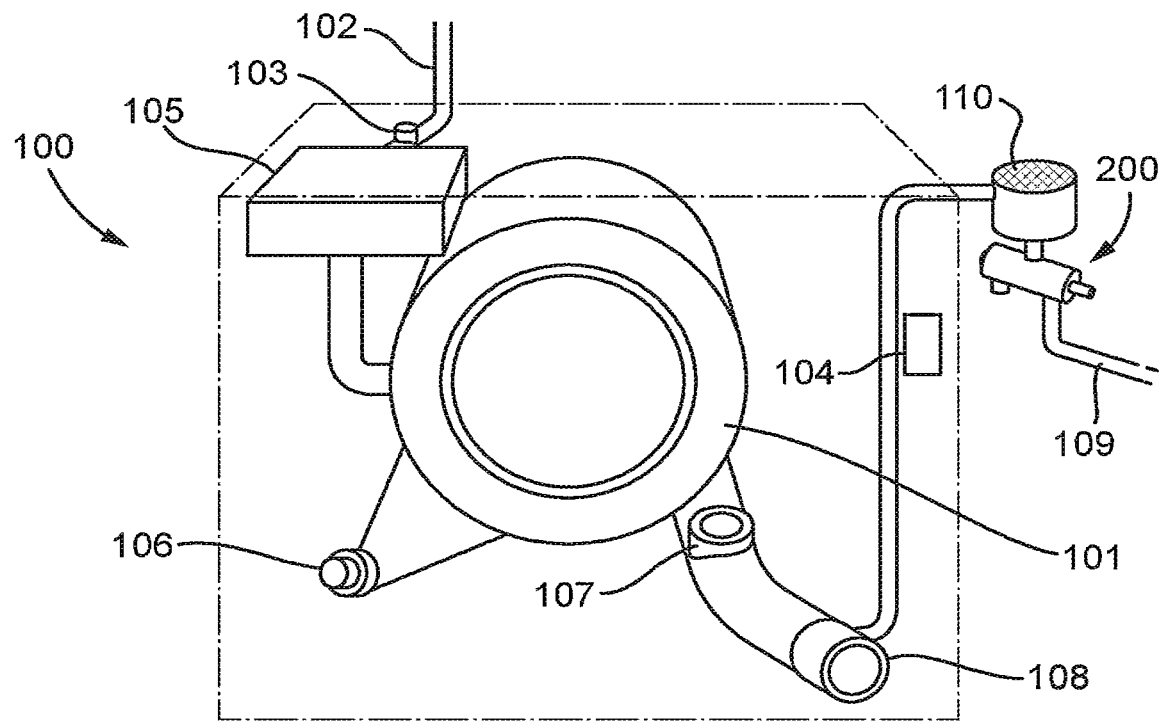
FIG. 2b is a view of an embodiment of the invention that is installed outside the washing machine of FIG. 1.

FIG. 2a shows one embodiment of compactor 200 as part of a domestic washing machine 100. This compactor 200 may be incorporated within the workings of the washing machine 100 by the manufacturer. Alternatively, the compactor 200 be a standalone unit that can be added into a waste water outlet of an existing washing machine 100 as shown in FIG. 2b, typically in conjunction with an external filter unit 110 to receive and process the filtered waste from the filter unit 110. The filter unit 110 may be of the type described in UK patent application numbers GB1914545.7 and GB1914548.1. The compactor 200 is configured to receive waste effluent 203 from any sumps or filtered effluent outlets within the washing machine 100 or filter unit 110. This compactor 200 generates a compressed microplastic 207 waste product in the form of a pellet, from waste effluent 203. The compactor 200 provides an additional filtering process to the waste effluent, removing all microplastic particles, resulting in waste water 209 from a waste water outlet 208 that would be fit to be connected to a household drainage system. The resulting compressed pellet can then be conveniently handled by a user and disposed of in an environmentally responsible way, for example by forwarding it to a recycling facility.

Figure 3A:
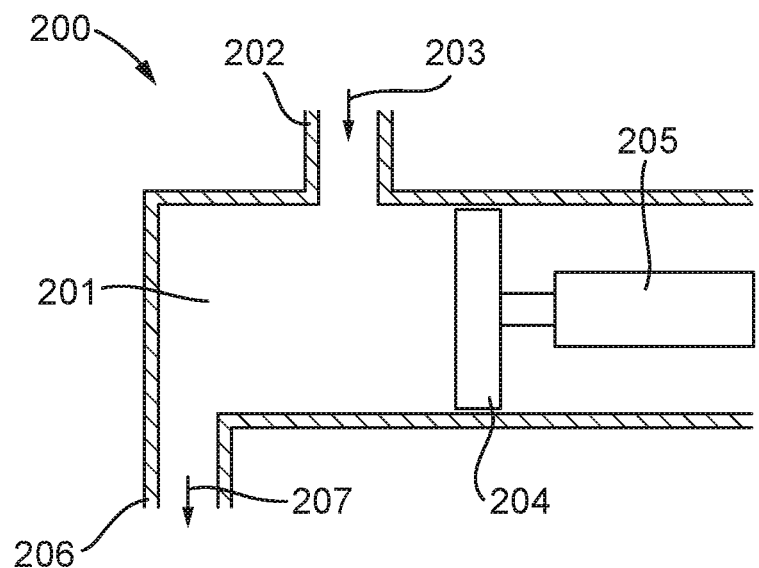
FIG. 3a is a side-section view of an embodiment of the invention, in a non-compressing position.
Figure 3B:
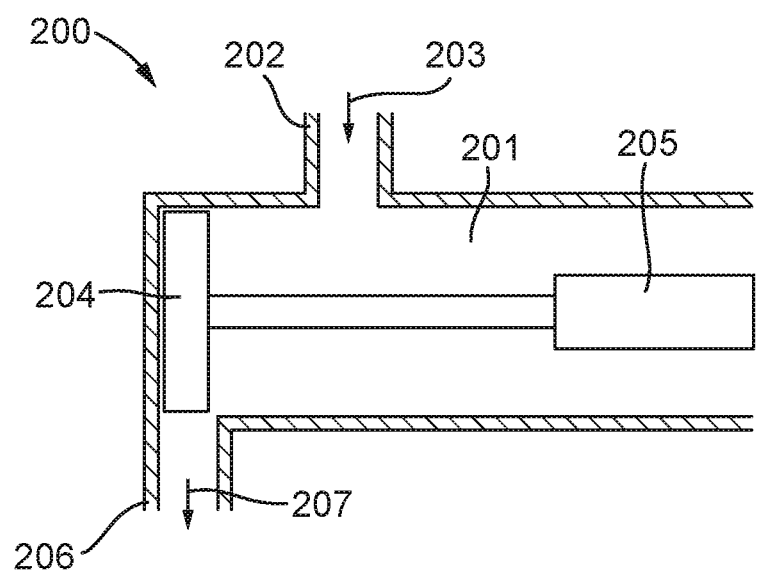
FIG. 3b is a side-section view of the embodiment shown in FIG. 3a, in a compressing position.
Figure 3C:
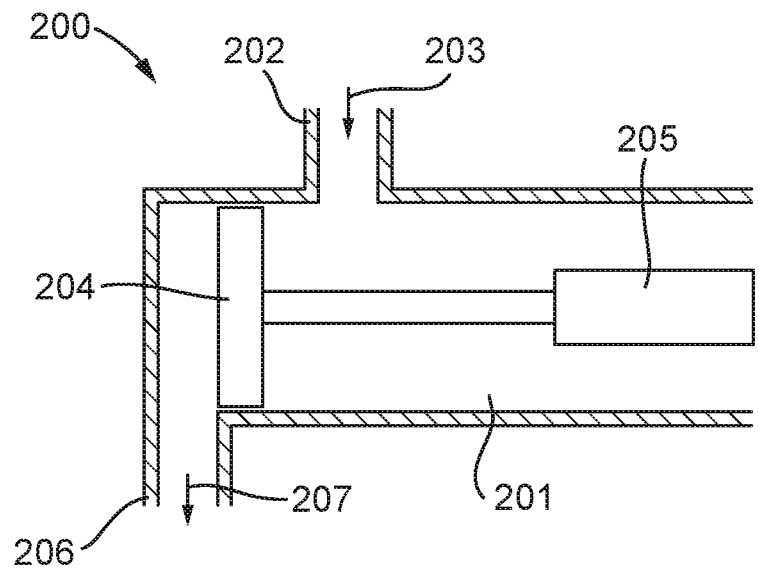
FIG. 3c is a side-section view of the embodiment shown in FIG. 3a, in a pellet releasing position.

FIGS. 3a to 3c show one embodiment of compactor 200 in basic form, comprising a chamber 201 for receiving waste effluent 203 through an inlet 202. A discharge outlet 206 is provided within the chamber 201. A plate 204 is disposed within the chamber 201 and is coupled to a drive unit 205. FIG. 3a shows the plate in a retracted or non-compressing position, prior to engaging a drive means. An inlet valve is provided (not shown) near the inlet 202 that can control the flow of effluent into the chamber 201. The flow of effluent is not continuous; it is controlled by the inlet valve to fill the chamber and then to close off. Alternatively, the inlet valve can be operated so that the sumps of the separator are emptied into the chamber 201, and then close off so that the sumps can refill.

The discharge outlet 206 can be opened and closed. During an operating cycle, the inlet valve is opened to let effluent into the chamber 201, while the outlet is closed, so that effluent cannot escape. The plate 204 can be driven by the drive unit 205 through the waste effluent 203 that has entered the chamber 201, where it compacts the microplastic matter, specifically by being compressed between the plate 204 and a wall of the chamber 201, as shown in FIG. 3b. The microplastic matter is effectively collected from the waste effluent 203, and squeezed, removing all liquid, and resulting in a solid mass of compressed microplastics. The plate 204 can be withdrawn by operation of the drive unit 205 in the opposite direction to release the solid mass as shown in FIG. 3c. The outlet is opened to release both the compressed microplastics and the separated fluid. The compressed microplastics are in a form that can be easily and conveniently disposed of by a user.

The discharge outlet 206 may be configured within the chamber 201 such that the solid mass of compressed microplastics 207 falls out of the chamber 201 under gravity, when the discharge outlet 206 is open. Alternatively, a discharge mechanism may be incorporated within the chamber 201 to force the compressed microplastics 207 through the discharge outlet, not shown.

Figure 3D:
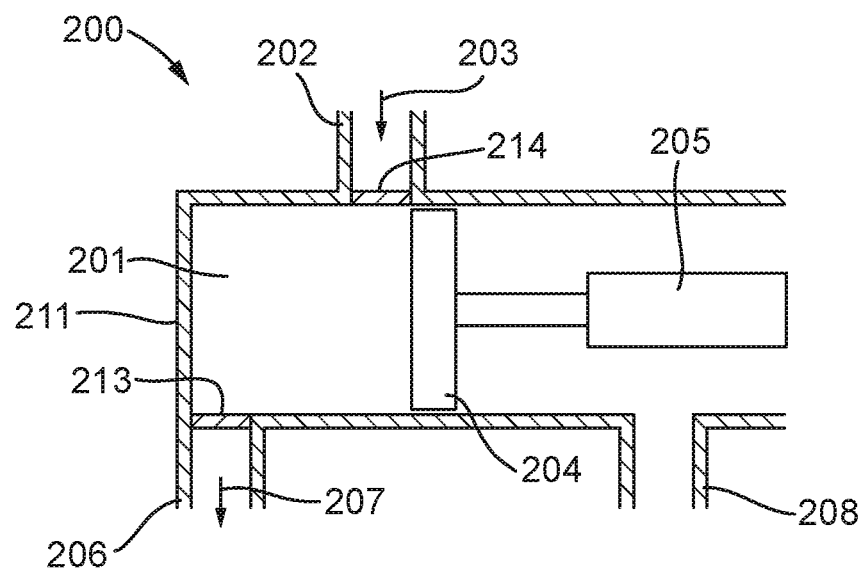
FIG. 3d is a side-section view of another embodiment.
Figure 3E:
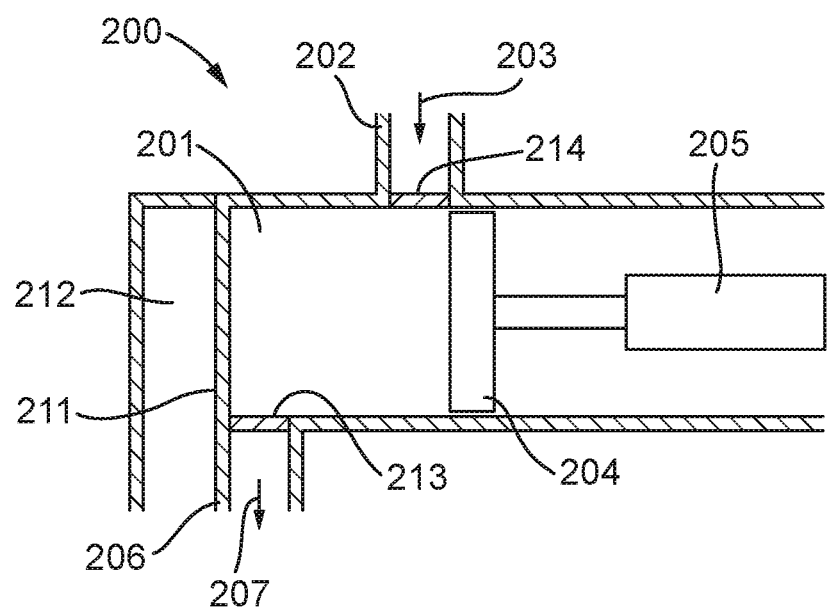
FIG. 3e is a side-section view of another embodiment.

An element of the compactor 200 is permeable to allow water to escape while the chamber is being compressed. The pores of the permeable structure can be of diameter of the order 50 micrometers so that no microfibers can pass that are greater than this size. Other sizes are possible as discussed below. The permeable structure may be the plate 204, which can be made of a rigid mesh or a flexible mesh supported by a framework. In this embodiment, water escapes from the rear of the chamber behind the plate 204 through a drainage channel 208 as shown in FIG. 3d. Alternatively the rear wall 211 of the chamber 201 may be permeable and a drainage channel 212 provided to transfer waste water away from the compactor, as shown in FIG. 3e. Alternatively, or in addition, the discharge outlet 206 may be closable with a permeable flap 213, as shown in FIGS. 3d and 3e, which is in the closed position during compression of the effluent and opens to allow the compressed pellet to fall out. A flap 214 may be provided at the inlet to prevent effluent from escaping out of the inlet during the compression phase.

Suitable permeable materials include meshes. An ideal mesh aperture is 80 um, which can stop 99.4% of microfibers of 25 um in size. However, a small aperture size means that it can blind over more quickly and also flow rate is reduced. A large mesh size can be used of anywhere up to 400 um. The advantage of using larger mesh apertures is that they are more robust than the smaller aperture meshes and can be fabricated cheaply by moulding. However, the water removed by this mesh will contain a significant proportion of microfibers and therefore will need to be returned to the filtration stage for separation.

The drive unit 205 may comprise a linear actuator for moving the plate 204 from a non-compressing position to a compressing position. The linear actuator may be ram driven, creating a linear reciprocating action. On the forward stroke, the plate 204 moves from a non-compressing position into a compressing position, through any waste effluent 203 within the chamber 201, collecting any accumulated waste matter, and moves and squeezes this accumulated waste matter against the wall of the chamber 201. On the reverse stroke, the plate 204 moves from the compressing position back to a non-compressing position, releasing the now compressed waste matter, which is urged into position for discharge through the discharge outlet 206.

The drive means 205 may comprise a hydraulic actuator, for creating the required linear reciprocating action of moving the plate 204 from a non-compressing position to a compressing position. This fluid motor may be supplied with pressurised water from the washing machine or mains water pressure.

The compactor 200 may incorporate a single plate 204 for compressing the waste matter. Alternatively, the compactor 200 may comprise additional plates for compressing the waste matter. The plates 204 may be made from a permeable material, such as a mesh. This permeable material is configured to extract the microplastic fibers from the waste effluent 203 whilst passing through the waste effluent 203, keeping these microplastic fibers against its planar compressing face, whilst allowing the resulting waste water to pass through the plate 204, now free from microplastic fibers, for disposal through standard drainage systems, i.e. connected to outlet 109 in the washing machine setup shown in FIGS. 2a and 2b.

In this embodiment and all other embodiments of the invention, the outlet and inlet preferably include non-return valves.

Figure 4:
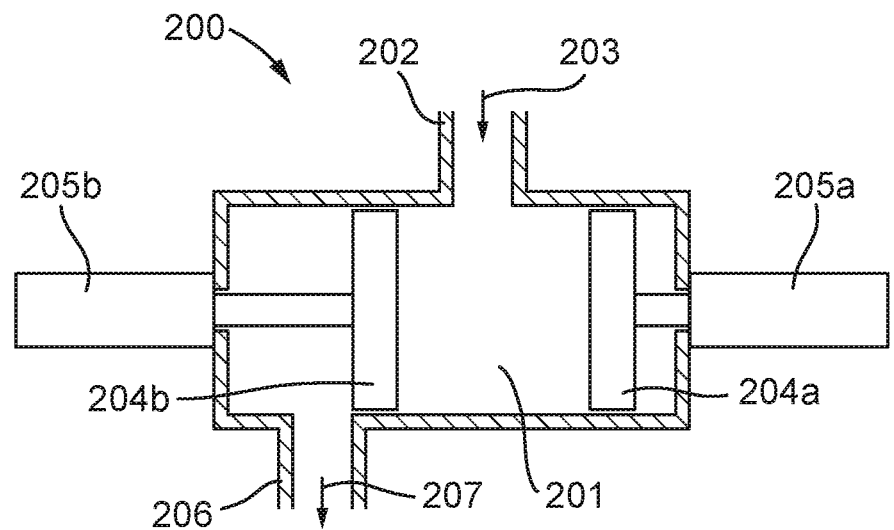
FIG. 4 is a side-section view of another embodiment of the invention.

FIG. 4 shows another embodiment of the invention, showing the compactor 200 when provided with a pair of co-operating plates 204a and 204b within the chamber 201. This pair of co-operating plates 204a and 204b in a non-compressing configuration, are spaced apart from one another to enable waste effluent 203 to be received therebetween. The waste effluent 203 is supplied through the inlet 202. The pair of co-operating plates 204a and 204b are substantially parallel with planar faces that face one another, and are moveable towards and away from one another along a common axis in this embodiment.

The plates 204a and 204b are each configured to be driven by a drive unit 205a and 205b respectively. The drive units 205a and 205b may be any combination of linear actuator or hydraulic actuator, suitable for driving the plates 204a and 204b towards one another. The plates 204a and 204b are made from a permeable material, such that upon compressing of the waste effluent 203 the waste water 209 passes through to the waste water outlet 207.

The accumulated microplastics are compressed between the plates 204a and 204b to form a compressed, solid puck. The plates 204a and 204b return to their non-compressing positions, and in doing so, move the compressed microplastics 207 to be aligned for discharge through the discharge outlet 206, by appropriate actuation of the drive units 204a and 204b.

Figure 5:
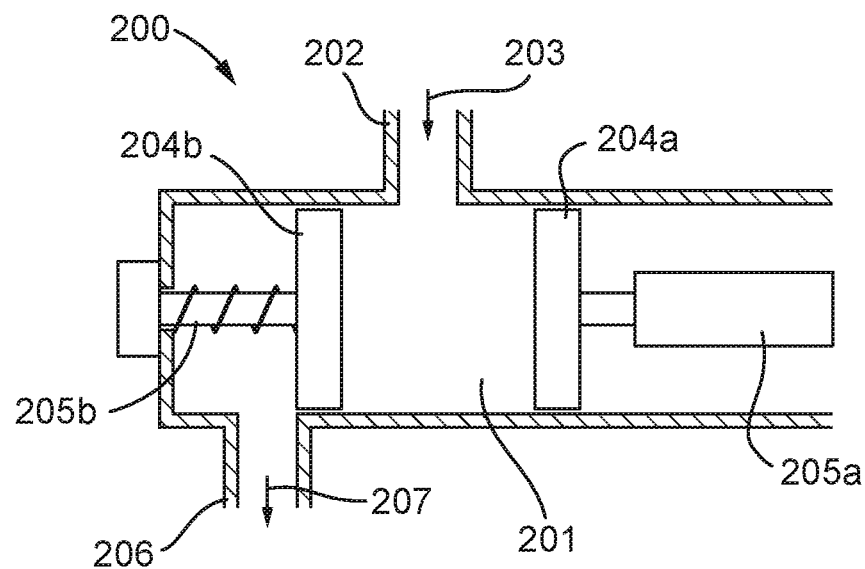
FIG. 5 is a side-section view of another embodiment of the invention.

FIG. 5 shows another embodiment of compactor 200, where the first plate 204a is driven by the drive unit 205, and the second plate 204b is supported in position by a biasing element 210. The first plate 204a is driven by the drive unit 205a towards the second plate 204b, compressing the microplastics therebetween. The first plate 204a forces the second plate 204b to move in the same direction, against the resistive force generated by the biasing element 210. A latch is provided (not shown) so that the second plate 204b can latch in an open position. When the compressing phase is over and the first plate 204a is returned to its non-compressing position, the second plate 204b remains in an open position; the compressed microplastics 207 become free of both plates and as they are in alignment with the discharge outlet 206, can drop out. The second plate 204b can then be reset by releasing the latch, so that it is driven by the biasing means 210, to return to it's original non-compressing position. The biasing element 210 may comprise a spring.

Figure 6A:
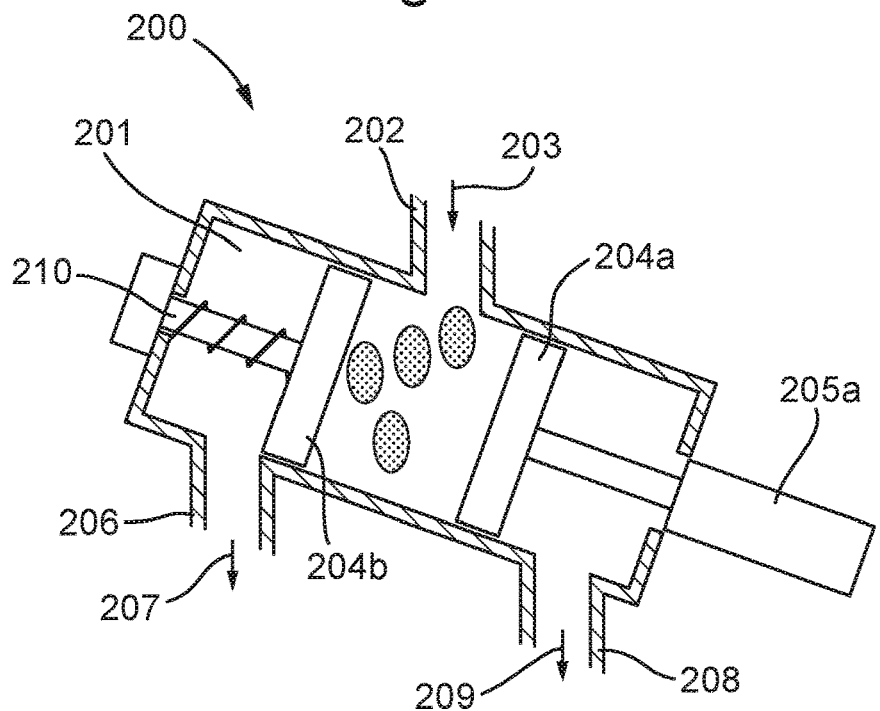
FIGS. 6a to 6d is a side-section view of another embodiment of the invention, showing the stages of compressing and discharging microplastics.
Figure 6B:
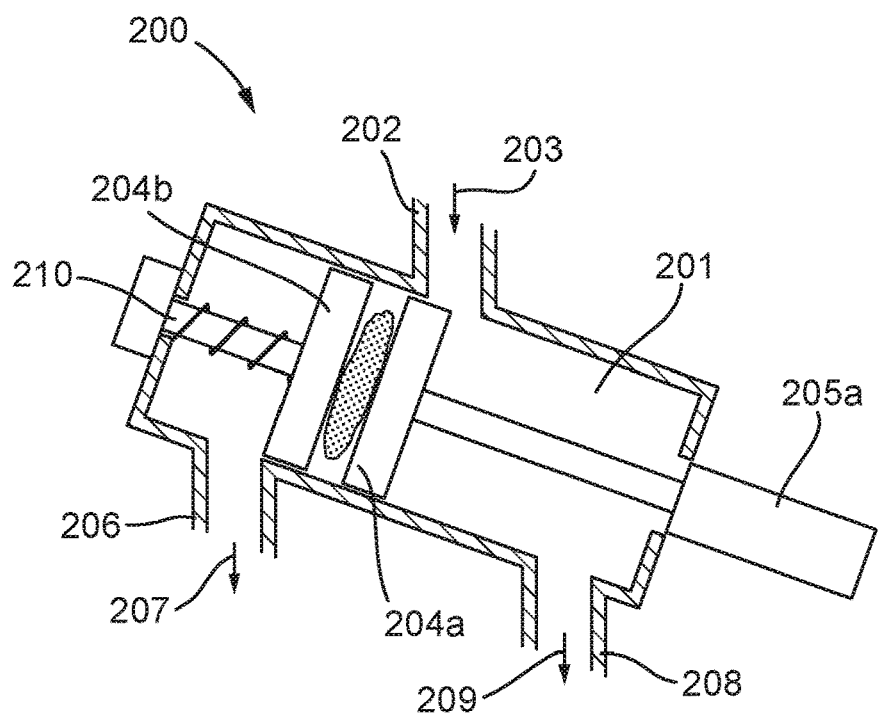
Figure 6C:
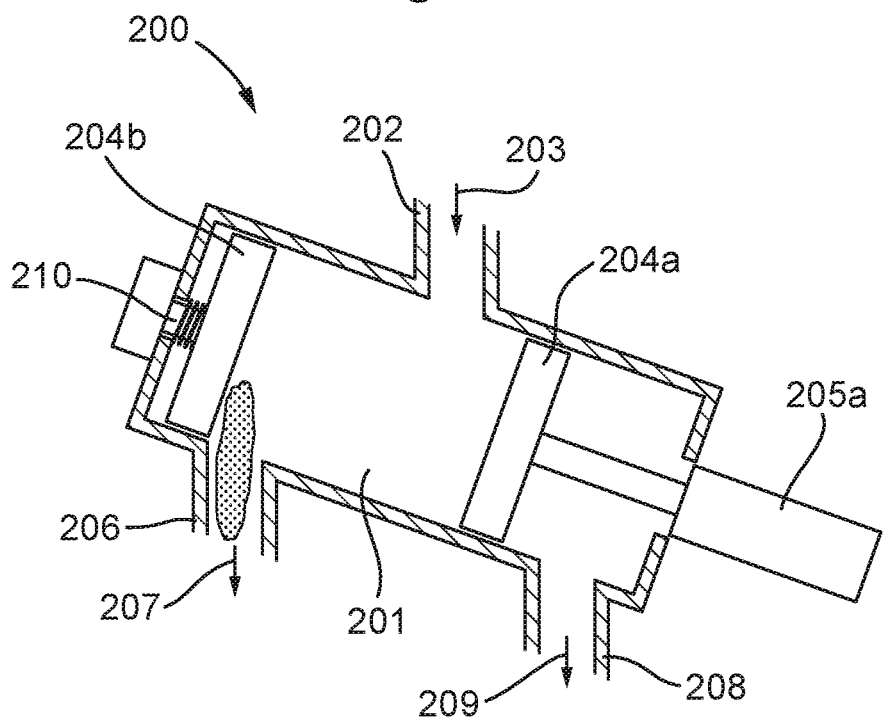

To assist with the discharge of the compressed microplastics 207 through the discharge outlet 206, and the waste water 209 through the waste water outlet 208, the chamber 201 may be configured to be mounted at an angle, as shown in FIGS. 6a, 6b and 6c. This angle allows the discharge of compressed microplastics 207 to be under gravity, rather than requiring any additional mechanical elements. It also makes the operation of cleaning the compactor 200 far more convenient for the user.

FIGS. 6a, 6b and 6c show the passage of waste effluent 203 through the compactor 200, when in its non-compressing configuration, it's compressing configuration and then in its discharging configuration. The waste effluent 203 enters the chamber 201 of the compactor 200 through the inlet 202, upon emptying of a washing machine sump, or through a waste hose, not shown. The drive means 205 is activated to drive the first plate 204a along the chamber 201, collecting microplastic fibers from within the waste effluent 203 as it travels by its mesh-type plate. The filtered or waste water 209 passes through the plate 204a, for discharge through the waste water outlet 208. The accumulated microplastic fibers are driven together, and driven into each other and into the second plate 204b, as shown in FIG. 6b. By compressing the microplastic fibers between plates 204a and 204b, any remaining liquid is squeezed out, and the fibers themselves become compacted, forming a solid mass or puck. This solid mass comprises compressed microplastics 207 that have effectively been dried through squeezing, thus forming a pellet or puck.

The first plate 204a drives the second plate 204b further along the chamber 201 and against the biasing element 210 until it reaches the end of its travel, at which point the second plate 204b latches in an open position.

The first plate 204a is driven away from the second plate 204b when the drive means 205a is reversed, and the first plate 204a returns to its start position, as shown in FIG. 6c. The latched second plate remains where it is and the compressed microplastic pellet is then free to drop out of the discharge outlet 206. The cycle is reset by the second plate moving back to its unlatched start position. This could be achieved with a push rod releasing the latch when the first plate 204a returns to its starting point.

The user retrieves the compressed microplastics 207 from the chamber 201, either by opening a trap door or removable lid, not shown. In other embodiments, the discharge of the compressed microplastics 207 can be an automated part of the process, whereby the return path of the first plate 204a, and the draining of any remaining waste water 209, opens the discharge outlet 206, or releases the catch in order to do so. The compressed microplastics 207 drop out of the chamber 201 of the compactor 200.

Figure 6D:
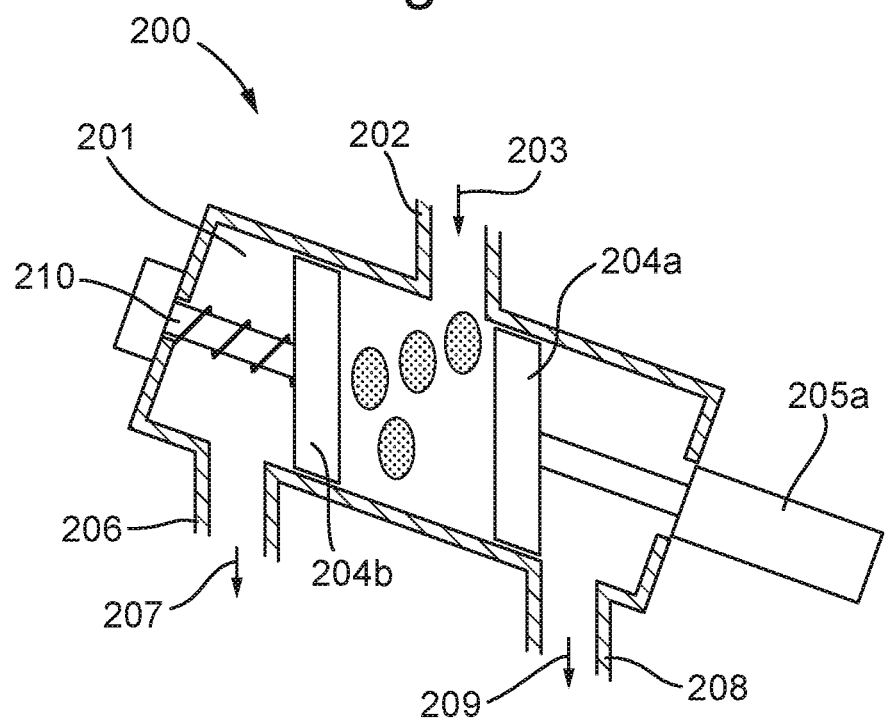

In the embodiment shown in FIG. 6d, the chamber is mounted at an angle, allowing waste water to drain out of the outlet 208, but the plates 204a, 204b are orientated vertically, so that they form a parallelogram with the sides of the chamber. This allows the compacted pellet to be released under gravity more easily from the face of the first plate 204a.

Figure 7:
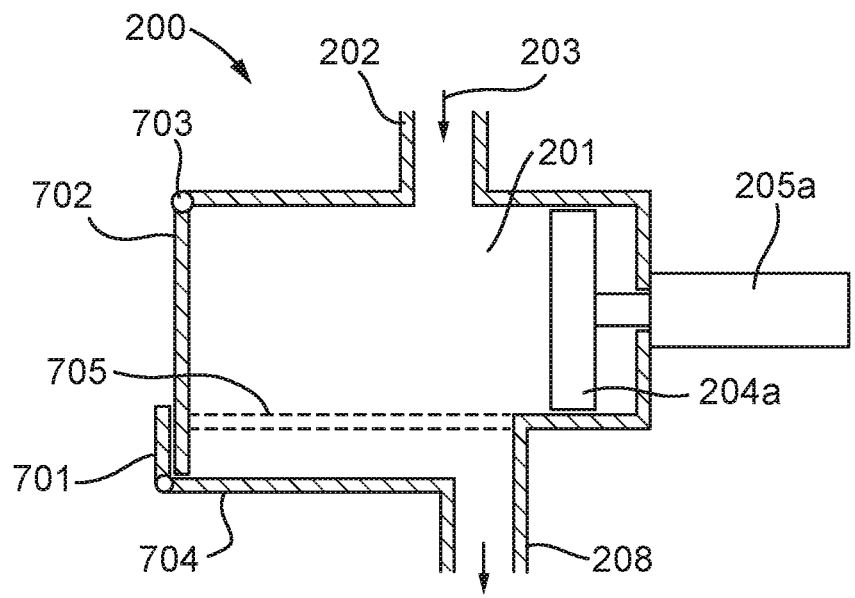
FIG. 7 is a side-section view of another embodiment of the invention, where the rear end of the chamber opens to release the compressed microplastics.

FIG. 7 shows another embodiment of the invention where plate 204a is non-porous. The lower wall of the chamber 201 is provided with a mesh structure 705 and beneath that there is a catching trough 704 that feeds water to outlet 208. The end wall of the chamber 201 is a solid flap 702 and has a hinge joint 703 so that it may swing away to give access to the interior of the chamber 201. The chamber has a latch 701 to keep the flap shut. The latch 701 is activated by a pushrod (not shown) connected to the plate 204a so that when the plate reaches its full length of travel it actuates the latch and the door swings open. A mechanism (not shown) is provided to close the flap 702 and latch it shut again. In use, effluent enters the chamber 201 through the inlet 202, the actuator 205a moves piston 204a through the chamber, squeezing the water out of the effluent, which passes through the mesh 705 and out of the outlet 208, until the piston 204a is squeezed firmly up against the flap 702 to form a pellet or puck of waste material including the microfibres. At this point the latch 701 operates, the flap opens and the pellet is ejected for subsequent disposal. The actuator 205a then causes the piston to withdraw, the flap to close and latch shut again ready for the next cycle.

Figure 8:
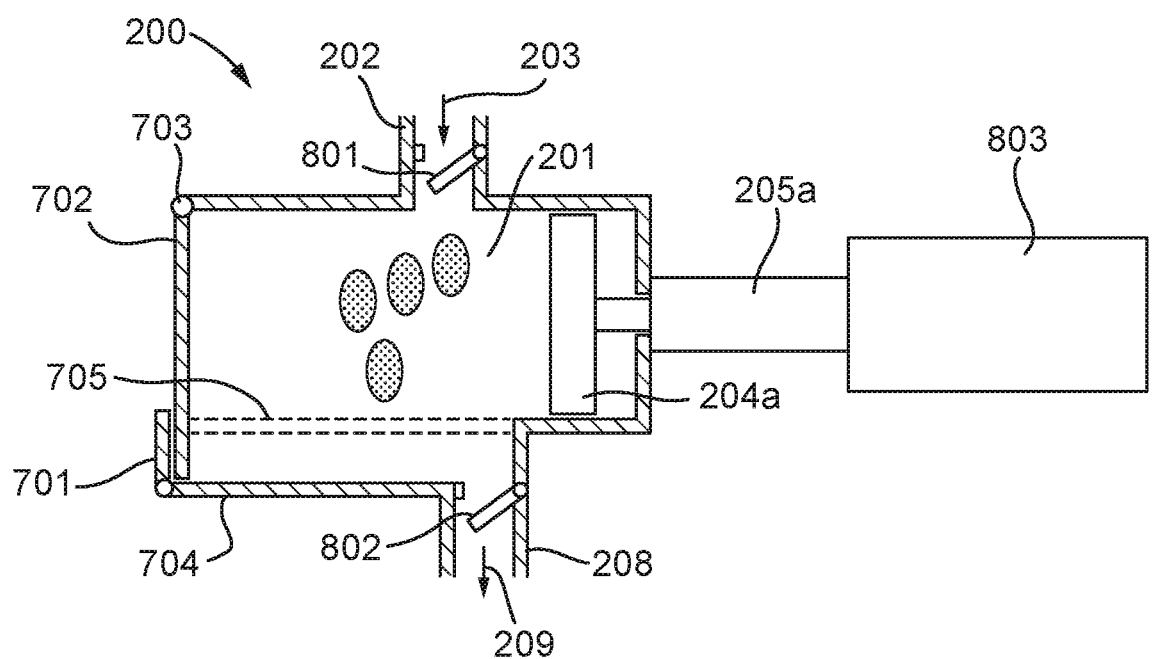
FIG. 8 is a side-section view of another embodiment of the invention, where the washing powder drawer of a washing machine is connected to a plunger.

FIG. 8 shows another embodiment of the invention, which includes the addition of non-return valves 801, 802 on the inlet and outlet respectively and an inlet moved towards the flap 702. In this arrangement, the action of withdrawing the piston after its compression stroke has the effect of drawing effluent into the chamber 201. The action of pushing the piston during its compression stroke closes the inlet non-return valve 801 and pumps waste water out of the outlet 208.

Figure 9:
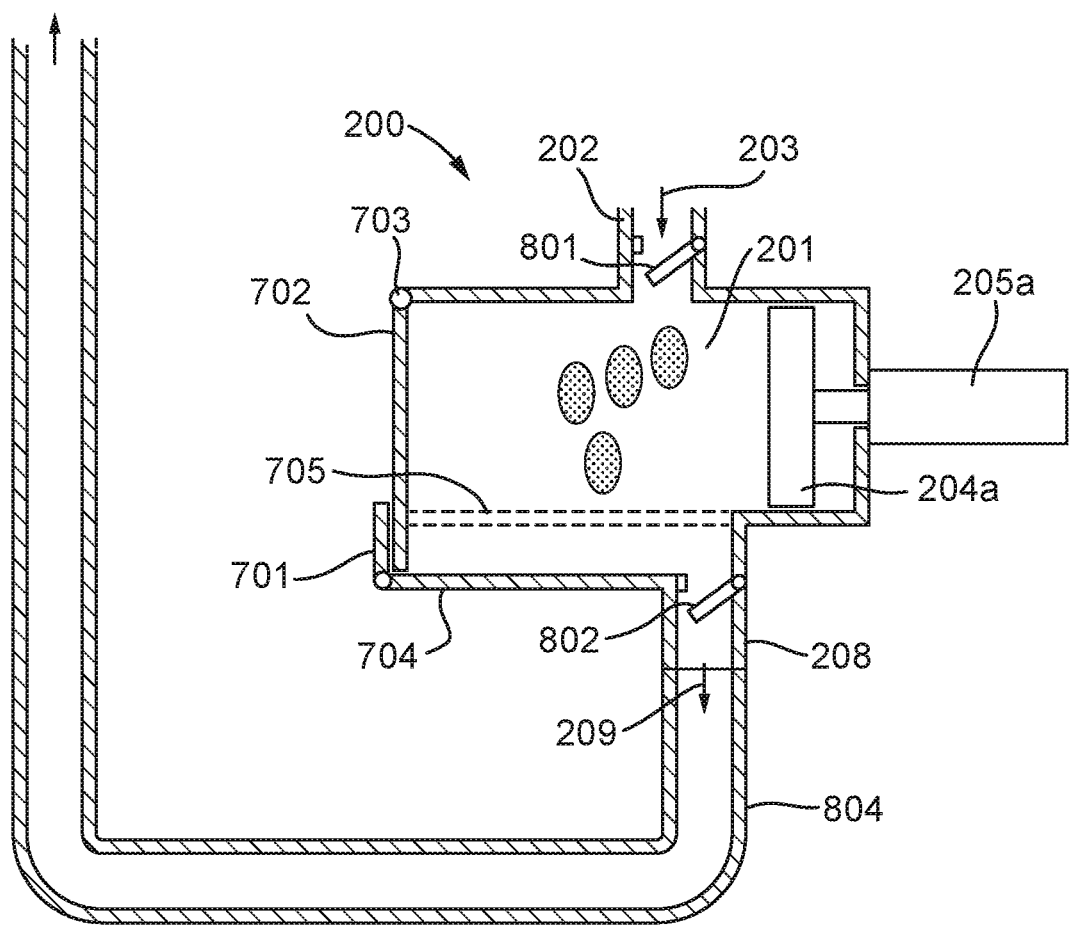
FIG. 9 is a side-section view of another embodiment of the invention, arranged to pump waste water away from the chamber.

In FIG. 9, the use of this arrangement can be seen in that the water extracted from the effluent can be pumped back into the system via pipe 804 where it can be re-filtered if necessary. This may be required if the aperture of the mesh 705 is large, for example 400 um. This arrangement is effectively a pump that could potentially replace the pump in a washing machine. A user could repeatedly operate the drawer, or this could be automated as a piston on a drive, until the drum of the washing machine is empty of effluent, and the effluent has passed through the filtration and compaction stages to remove and recycle the resulting solid material extracted from the waste fluid emptied from the washing machine.

A further addition shown in FIG. 8 is the piston 204a being connected to the washing powder drawer 803 when the unit is installed in a washing machine. The action of a user opening the drawer causes effluent to be sucked into the chamber 201, while the action of the user closing the drawer causes the plate 204a to move through the effluent, squeezing water out and compressing it against the flap 702 until the flap releases and a pellet is released.

Figure 10:
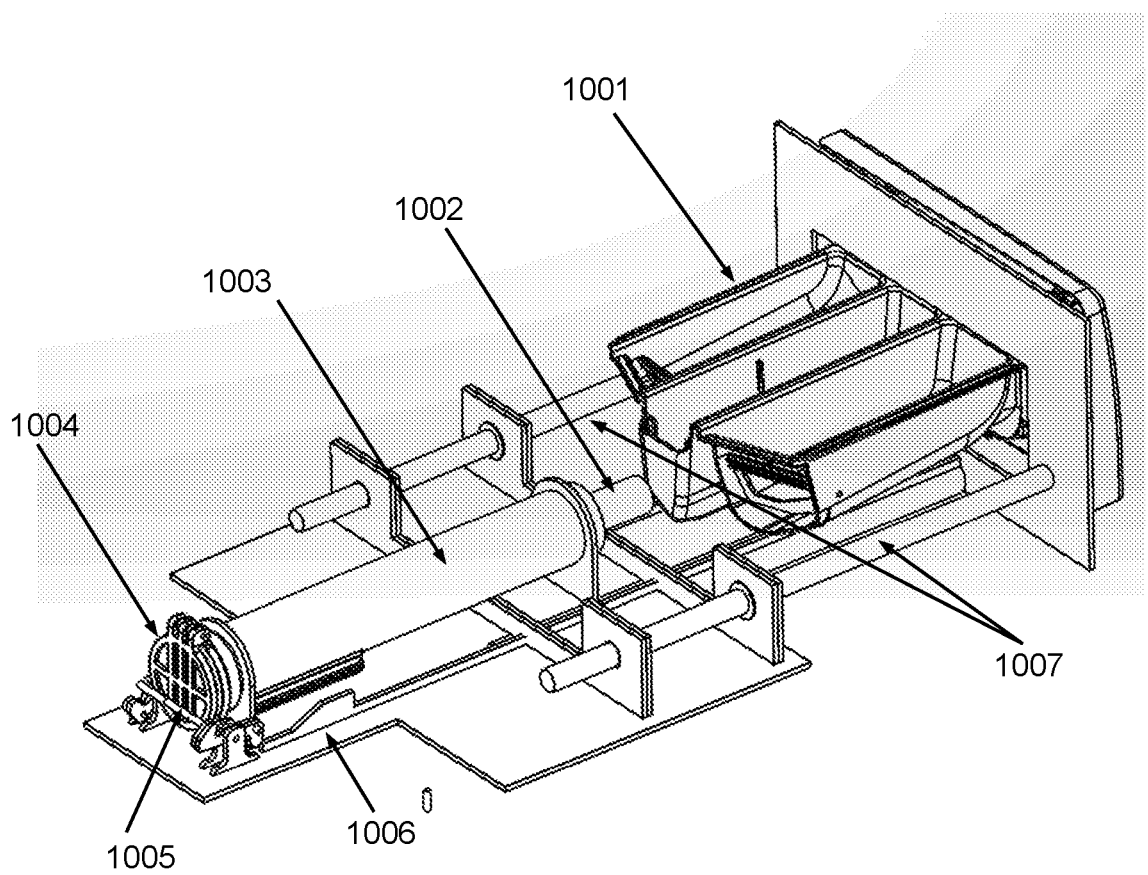
FIG. 10 is a perspective view of an embodiment of the compactor system connected to a washing machine drawer.

A set-up where the compression cycle is powered by the action of opening and closing the washing powder drawer of a washing machine is shown in FIG. 10. The drawer 1001 runs on guide rails 1007 and its end presses against actuator 1002. The actuator is connected to a piston inside the cylinder 1003. Effluent enters through and inlet (not shown) and extracted water exits through an outlet (not shown) potentially back into the washing machine drum to be used for the next wash. The end of the cylinder 1003 has a flap 1004 that includes a spring that causes it to spring open when latch 1005 operates. The latch 1005 is released by the activator 1006 which is connected to the drawer 1001.

The invention claimed is:

1. A compactor for extracting and compressing microplastics from waste effluent, the compactor comprising;
   a chamber;
   a wastewater inlet for supplying waste effluent into the chamber, wherein there is at least one plate within the chamber moveable between a non-compressing position and a compressing position;
   a drive unit for driving the at least one plate between the non-compressing position and the compressing position; and
   a first outlet and a second outlet, wherein the first outlet is a compressed microplastics discharge outlet and the second outlet is a wastewater outlet;
   wherein the compressed microplastics discharge outlet is arranged to allow the discharge of compressed microplastics, wherein the compressed microplastics discharge outlet is separate from the wastewater outlet, such that compressed microplastics are discharged from the compactor separately to the wastewater;
   wherein the inlet includes a valve to prevent waste effluent from escaping out of the inlet as the at least one plate is moved into the compressing position; and
   wherein the compactor is operable, in use, to extract and compress the microplastics from waste effluent, and wherein the at least one plate is arranged to move the compressed microplastics to the discharge outlet, and wherein the compactor is arranged such that, in use, the compressed microplastics are automatically discharged from the compactor via the discharge outlet by the movement of the at least one plate and the waste effluent is drained by the wastewater outlet.

2. The compactor of claim 1, wherein the at least one plate comprises a pair of co-operating plates comprising a first plate and a second plate, wherein the pair of plates are spaced from one another to enable waste effluent to be received and compressed therebetween, wherein the drive unit drives at least one of the first and second plates towards and away from each other.

3. The compactor of claim 2, wherein the first plate moves the second plate into a compressing position, and the second plate comprises a biasing element for returning the second plate to the non-compressing position.

4. The compactor of claim 3, wherein the biasing element is a spring.

5. The compactor of claim 1, wherein the chamber has a releasable end which forms the discharge outlet.

6. The compactor of claim 1, wherein the drive unit comprises a linear actuator.

7. The compactor of claim 1, wherein the drive unit is a manually operated drive including a lever or a push rod.

8. The compactor of claim 1, wherein the drive unit is configured for coupling to a drawer of a washing machine.

9. The compactor of claim 8, wherein the drive unit is a hydraulic actuator configured for coupling to a pressurized water supply from the washing machine.

10. The compactor of claim 1, wherein the at least one plate and/or a wall of the chamber comprises a permeable material.

11. The compactor of claim 10, wherein the permeable material is a mesh.

12. The compactor of claim 1, wherein the wastewater outlet and wastewater inlet include non-return valves.

13. The compactor of claim 1, wherein the chamber is substantially cylindrical.

14. The compactor of claim 1, wherein the discharge outlet is within a lower wall of the chamber arranged to discharge compressed microplastics under gravity.

15. The compactor of claim 1, wherein the discharge outlet comprises a removable lid.

16. A washing machine including the compactor of claim 1.

17. A method of operating the compactor according to claim 1, comprising the steps of:
receiving a flow of wastewater effluent having microplastics entrained therein;
driving a plate through the effluent from a non-compressing position to a compressing position, for separating water from the effluent and compressing the resultant material which includes microplastics;
returning the plate to a non-compressing position;
discharging the compressed microplastics through the discharge outlet; and
discharging the separated water through the waste water outlet.

18. The compactor of claim 6, wherein a ram is driven by the linear actuator with linear reciprocating action.

* * * * *